United States Patent [19]

Dantzig et al.

[11] 4,158,632

[45] Jun. 19, 1979

[54] FILTER FOR USE IN FILTRATION OF MOLTEN METAL

[75] Inventors: Jonathan A. Dantzig, New Haven; Derek E. Tyler, Cheshire, both of Conn.

[73] Assignee: Swiss Aluminium Ltd., Chippis, Switzerland

[21] Appl. No.: 900,066

[22] Filed: Apr. 26, 1978

[51] Int. Cl.² .......................... C04B 21/00; C22C 1/04
[52] U.S. Cl. .................................................... 210/510
[58] Field of Search ...................... 210/496, 498, 510; 106/40 V; 166/228; 75/20 F, 222, 68 R

[56] References Cited

U.S. PATENT DOCUMENTS 4,062,771  12/1977  Saupe .................................. 210/496

Primary Examiner—Frank Sever
Attorney, Agent, or Firm—Bachman and LaPointe

[57] ABSTRACT

The disclosure teaches an improved filter-type media which is characterized by a plurality of holes of equal size which are substantially larger than the pore size of the filter-type media thereby providing a preferential path through the filter-type media.

4 Claims, 5 Drawing Figures

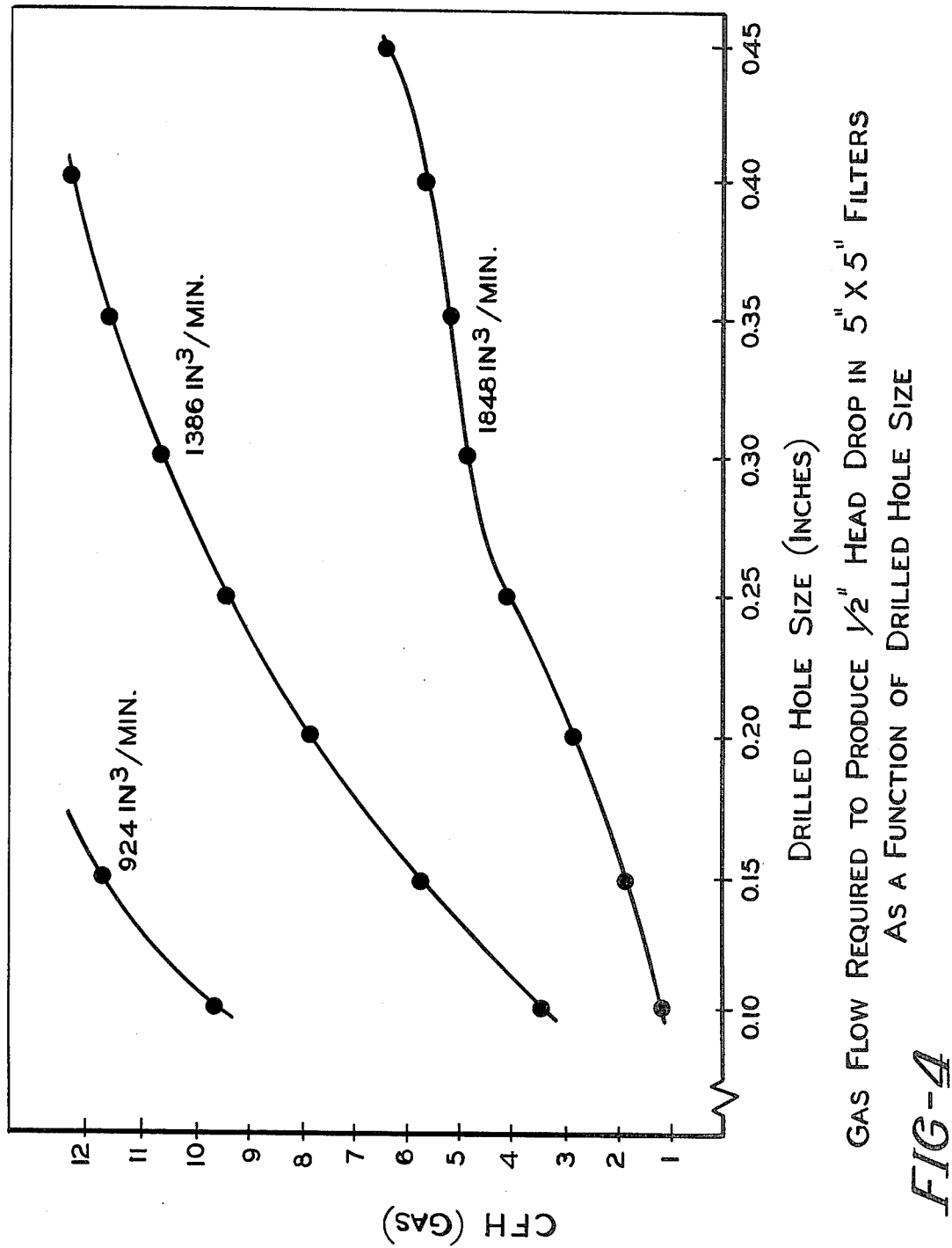

FILTER FOR USE IN FILTRATION OF MOLTEN METAL

BACKGROUND OF THE INVENTION

The present invention relates to the degassing of molten metal. Molten metal, particularly molten aluminum in practice, generally contains entrained and dissolved impurities both gaseous and solid which are deleterious to the final cast product. These impurities may affect the final cast product after the molten metal is solidified whereby processing may be hampered or the final product may be less ductile or have poor finishing and anodizing characteristics. The impurities may originate from several sources. For example, the impurities may include metallic impurities such as alkaline and alkaline earth metals and dissolved hydrogen gas and occluded surface oxide films which have become broken up and are entrained in the molten metal. In addition, inclusions may originate as insoluble impurities such as carbides, borides and others or eroded furnace and trough refractories.

One process for removing gaseous impurities from molten metals is by degassing. The physical process involves injecting a fluxing gas into the melt. The hydrogen enters the purge gas bubbles by diffusing through the melt to the bubble where it adheres to the bubble surface and is adsorbed into the bubble itself. The hydrogen is then carried out of the melt by the bubble.

It is naturally highly desirable to improve the degassing of molten metals in order to remove or minimize such impurities in the final cast product, particularly with respect to molten aluminum and especially, for example, when the resultant metal is to be used in a decorative product such as a decorative trim or products bearing critical specifications such as aircraft forgings and extrusions and light gauge foil stock. Impurities as aforesaid cause loss of properties such as tensile strength and corrosion resistance in the final cast product.

Rigorous metal treatment processes such as gas fluxing or melt filtration have minimized the occurrence of such defects. However, while such treatments have generally been successful in reducing the occurrence of such defects to satisfactory levels, they have been found to be inefficient and/or uneconomical. Conventionally conducted gas fluxing processes such as general hearth fluxing have involved the introduction of the fluxing gas to a holding furnace containing a quantity of molten metal. This procedure requires that the molten metal be held in the furnace for significant time while the fluxing gas is circulated so that the metal being treated would remain constant and treatment could take place. The procedure has many drawbacks, among them, the reduced efficiency and increased cost resulting from the prolonged idleness of the furnace during the fluxing operation and more importantly, the lack of efficiency of the fluxing operation due to poor coverage of the molten metal by the fluxing gas which is attributable to the large bubble size and poor bubble dispersion within the melt. Further factors comprise the restriction of location to the furnace which permits the re-entry of impurities to the melt before casting, and the high emissions resulting from both the sheer quantity of flux required and the location of its circulation.

As an alternative to the batch-type fluxing operations employed as aforesaid, certain fluxing operations were employed in an inline manner; that is, the operation and associated apparatus were located outside the melting or holding furnace and often between the melting furnace and either the holding furnace of the holding furnace and the casting station. This helped to alleviate the inefficiency and high cost resulting from furnace idleness when batch fluxing but was not successful in improving the efficiency of the degassing operation itself, in that the large size of the units and the undesirably large quantities of fluxing gas required per unit of molten metal were both costly and detrimental to air purity.

A typical inline gas fluxing technique is disclosed in U.S. Pat. No. 3,737,304. In the aforenoted Patent, a bed of "stones" is positioned in a housing through which the molten metal will pass. A fluxing gas is introduced beneath the bed and flows up through the spaces between the stones in counter flow relationship with the molten metal. The use of a bed of porous "stones" has an inherent disadvantage. The fact that the stones have their pores so close together results in the bubbles passing through the stones coalescing on their surfaces and thus creating a relatively small number of large bubbles rather than a large number of small bubbles. The net effect of the bubbles coalescing is to reduce the surface area of bubble onto which the hydrogen can be adsorbed thus resulting in low degassing efficiency.

One improved method and apparatus for the inline degassing and filtration of molten metal is disclosed in U.S. Pat. No. 4,052,198 to Yarwood et al. and assigned to the assignee of the present invention. The disclosure teaches an improvement in the degassing and filtration of molten metal using an apparatus which employs a pair of sequentially placed, removable filter-type elements and at least one fluxing gas inlet positioned therebetween. The fluxing gas is introduced into the melt through the inlet and flows through the first of said plates in countercurrent contact with the melt. The filter plate serves to break up the fluxing gas into a fine dispersion to insure extensive contact with the melt. The filter plates employed are made of porous ceramic foam materials which are useful for the filtration of molten metal for a variety of reasons included among which are their excellent filtration efficiencies resulting from their uniform controllable pore size, low cost, as well as ease of use and replaceability. The ceramic foam filters are convenient and inexpensive to prepare and easily employed in an inline degassing and filtration unit.

While the aforenoted U.S. Pat. No. 4,052,198 offers significant improvements over those inline gas fluxing techniques previously known in the art, a number of problems have been encountered. It is desirable for economic advantages and increased productivity to have degassing and filtration systems which can treat molten metal continuously at a rate commensurate with the casting practices. The employment of known inline degassing units such as aforenoted U.S. Pat. No. 3,737,304 for continuous degassing and filtration have been found to be extremely inefficient, thus requiring large multiple chamber arrangements necessary to sufficiently treat the quantities of molten metal which are required for continuous casting operations. As a result of the large size of the treatment units, supplemental heating is required to prevent freeze up of the molten metal as it is being treated. While some improvement in the quantity of molten metal which can be treated has been achieved by using a smaller system such as that disclosed in U.S. Pat. No. 4,052,198 which utilizes ceramic filters and countercurrent gas flow, such a system has been found to have a limited effectiveness in the quantity of molten metal which can be treated due to the large pressure drops encountered in the simultaneous countercurrent flow of gas and metal through the filter body. As a result of the large pressure drop, a large head of molten metal is developed upstream of the filter element thus requiring either an increase in size of the transfer passageway upstream of the filter element or a decrease in the rate of feeding the molten metal to the treatment unit.

Accordingly, it is a principal object of the present invention to provide an improved method and apparatus for the degassing and filtration of molten metal which employs filter-type plates which are characterized by reducing the pressure drop encountered in the simultaneous countercurrent flow of gas and metal through the filter-type plates.

It is a particular object of the present invention to provide an improved filter-type plate for reducing the pressure drop encountered across the filter plate as gas and metal flow in countercurrent relationship through the filter-type plate.

It is still a further object of the present invention to provide a filter-type plate having a preferential path for gas flow through the filter plate.

It is still a further object of the present invention to provide improvements as aforesaid which are convenient and inexpensive to utilize and which result in highly efficient metal degassing and filtration.

Further objects and advantages of the present invention will appear hereinbelow.

SUMMARY OF THE INVENTION

In accordance with the present invention, the foregoing objects and advantages are readily attained.

The present invention comprises a highly efficient degassing and filtration apparatus comprising a chamber having respective metal inlets and outlets, and wall surfaces for the support of at least a first and a second removable filter-type medium in sequential spaced-apart relationship, and at least one conduit providing at least one fluxing gas inlet port positioned between said first and said second medium, wherein said port is so positioned that fluxing gas issuing therefrom is capable of dispersion and percolation through said first medium. In a preferred embodiment, filter-type media are provided which possess an open cell structure characterized by a plurality of interconnected voids, and are preferably prepared from a ceramic foam wherein said voids are surrounded by ceramic material. The filter media may comprise plates having bevelled peripheral surfaces adapted to mate with bevelled wall surfaces on said chamber. A resilient sealing means is provided which is resistant to said molten metal to sealably engage the bevelled wall surfaces of said chamber upon installation of the filter plates.

In accordance with a preferred embodiment of the apparatus of the present invention, the filter-type media may be provided with the same pore size and permeability or differ in pore size and permeability whereby said first medium possesses a relatively coarser pore structure, higher permeability and larger available flow area than said second medium. In accordance with the improvement of the present invention, the first filter-type medium is provided with an array of holes substantially larger than the pore size of the filter medium itself so as to provide a preferential path for gas flow through said first medium. The fluxing gas is introduced below the first filter-type medium through a sparger plate located in the chamber. The sparger plate is provided with a plurality of orifices of particular size and spacing so as to minimize the diffusion distance for gaseous impurities while substantially preventing fluxing gas bubble coalescence.

In accordance with the method of the present invention, degassing and filtration of molten metal is conducted by the passage of a melt through a chamber wherein said melt passes through at least two sequentially placed, spaced-apart filter-type media, whereby said melt is brought into countercurrent contact with a fluxing gas while within and above the first of said media, said fluxing gas passing through said first filter-type media via a preferential path thus limiting undesirable pressure drop across said first filter-type media thereby increasing metal treatment efficiency. The fluxing gas issues from at least one inlet port provided within said chamber between said first and second of said media, dispersing and percolating up into contact with said melt within said first medium.

The method of the present invention may employ a fluxing gas such as an inert gas, preferably carrying a small quantity of an active gaseous ingredient such as chlorine or a fully halogenated carbon compound. The gas used may be any of the gases or mixtures of gases such as nitrogen, argon, chlorine, carbon monoxide, Freon 12, etc., that are known to give acceptable degassing. In the preferred embodiment of the degassing of molten aluminum melts, mixtures of nitrogen-Freon 12 or argon-Freon 12 are used. In addition, a supernatant salt cover comprised of alkaline and alkaline earth chlorides and a fluoride may be located on the surface of the melt to aid in the degassing process by minimizing the readsorption of gaseous impurities at the surface of the melt. Typical salts employed may be molten halides such as sodium chloride, potassium chloride, magnesium chloride, or mixtures thereof and should be selected to minimize erosion of the refractory lining of the degassing chamber. Alternatively, gaseous covers such as argon, nitrogen, etc., may be used as a protective cover over the molten metal to minimize the readsorption of gaseous impurities at the surface of the melt.

The present apparatus and method provide a considerable increase in productivity in the degassing of molten metal as degassing is conducted without interruptions of the melting furnace. Further, the design of the apparatus enables its placement near to the casting station, whereby the possibility of further impurities entering the melt is substantially eliminated.

The employment of the first filter-type medium of the present invention in the above apparatus allows for a preferential path for the flow of gas through said filter medium thus limiting the pressure drop across said medium and thereby contributing to greater efficiency of the apparatus.

The employment of the sparger plate in the present invention in the above apparatus minimizes the bubble size of the purged gas while maximizing the gas bubble density thereby increasing the effective surface area for carrying out the adsorption reaction thus optimizing the degassing of the molten metal.

In addition, the efficiency of the present invention permits degassing to be conducted with a sufficiently lower amount of flux material whereby the level of effluence resulting from the fluxing operation is greatly reduced.

The present apparatus and method provide considerable increase in productivity in the degassing of molten metal as degassing is conducted without interruption of alloy and melt processes. Further, the design of the apparatus permits its placement near to the casting. The present invention enables the operation of a fluxing and filtering process which achieves significant reduction in the level of effluents normally resulting from processing of this kind.

By virtue of the employment of conveniently removable filter-type media possessing carefully controlled filter properties, the apparatus and method of the present invention are capable of achieving levels of melt purity heretofore attainable only with the most rigorous of processing. Also, the employment of a relatively coarse first filter-type medium to abstract larger entrained non-metallic particulate before the melt reaches the second fine filter greatly extends the useful life of the latter. In addition, these high levels of purity are attained utilizing inexpensively manufactured filter-type media.

BRIEF DESCRIPTION OF THE DRAWINGS

FIG. 4 is a graphic illustration of the improved flow rate obtained in accordance with the method and apparatus of the present invention.

DETAILED DESCRIPTION OF PREFERRED EMBODIMENTS

Figure 1:
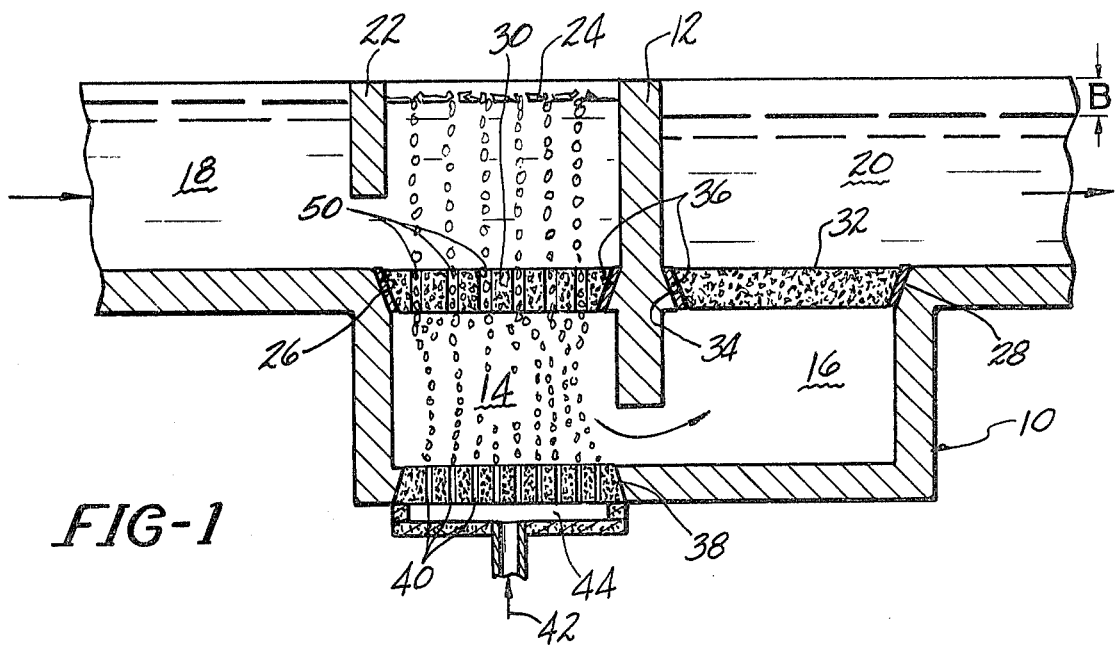
FIG. 1 is a side sectional view of the apparatus of the present invention in which the first and second filter-type media are disposed in substantially side-by-side relationship.

Referring to FIG. 1, the apparatus is illustrated in location with a molten metal transfer system which may include pouring pans, pouring troughs, transfer troughs, metal treatment bays or the like. The apparatus and method of the present invention may be employed in a wide variety of locations occurring intermediate to the melting and casting stations in the metal processing system. Thus, FIG. 1 illustrates a refractory fluxing and filtering apparatus 10 which is divided by baffle wall 12 into chambers 14 and 16. The molten metal enters chamber 14 through inlet launder 18, passes under baffle 12 into chamber 16 and down outlet 20 for further processing. The apparatus 10 may optionally be provided with inlet baffle 22 which serves to confine an optional salt layer 24 on the surface of the metal in chamber 14 and prevent it from floating backwards along the launder 18.

In accordance with a preferred embodiment of the present invention each of the chambers 14 and 16 is provided with at least one peripheral rim, 26 and 28 respectively, positioned in a substantially side-by-side relationship with respect to each other and at a level which is continuous with the bottom of respective inlet and outlet launders 18 and 20. The first peripheral rim 26 and second peripheral rim 28 are illustrated in FIG. 1 as defining a downwardly converging bevelled surface which enables the expeditious installation and replacement of appropriately configured filter-type media. Though rims 26 and 28 are illustrated as having bevelled surfaces, the invention is not limited thereto, as rims possessing other means for retaining in place the filter-type media of the present invention may be employed as will be noted hereinbelow.

Filter-type media 30 and 32 are provided in chambers 14 and 16, respectively, and may possess bevelled peripheral surfaces 34 adapted to mate with correspondingly configured peripheral rims 26 and 28. The bevelled peripheral surfaces 34 are provided with resilient sealing means 36 thereon which are resistant to molten metal, and the respective filter media 30 and 32, including seal means 36 are sequentially inserted into chambers 14 and 16, respectively, so that seal means 36 in each instance engages the respective bevelled surfaces of rims 26 and 28.

The floor of refractory fluxing and filtering apparatus 10 in the area of chamber 14 is provided with a cast ceramic sparger plate 38 having a plurality of orifices 40 for introducing a fluxing gas from an outside source, not shown, from the inlet 42 and plenum chamber 44 into the molten metal as it passes through chamber 14.

Figure 2:
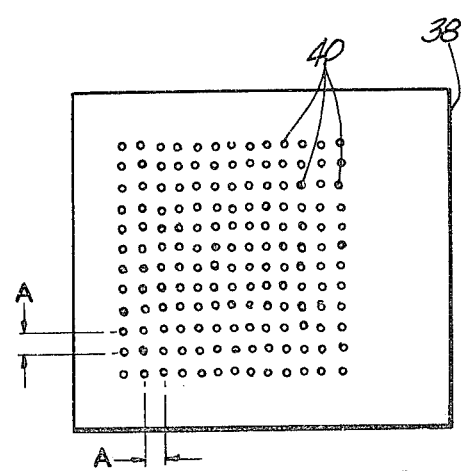
FIG. 2 is a top view of the sparger plate used in the apparatus of FIG. 1.

In the preferred embodiment of the present invention, the use of a cast ceramic sparger plate has a distinct advantage over conventional methods and apparatuses for introducing fluxing gas into a molten metal. In accordance with the present invention, in order to optimize the efficiency of the degassing process, that is, maximize the efficiencies of the kinetics of the adsorption reaction, the introduction of the fluxing gas into the melt should be optimized so as to provide minimum bubble size and maximum bubble density while eliminating bubble coalescence. Thus, the mean distance between the orifices in the sparger plate should be controlled so as to prevent fluxing gas bubble coalescence while minimizing the diffusion distance which the gaseous impurities must travel through the melt to a bubble. Maximum adsorption efficiency is obtained by employing a sparger plate as illustrated in FIG. 2. The use of discrete orifices 40 in the sparger plate avoids bubble coalescence and allows for control of the bubble size and dispersion. The size of the individual orifices 40 determines the size of the bubble. Accordingly, in order to maximize surface area for the adsorption reaction, the orifices are made as small as possible consistent with preventing plugging of the orifices with metal over several uses. In accordance with the present invention, an orifice size in the range of 0.005" to 0.50", preferably 0.010" to 0.20" has been utilized for degassing molten aluminum and aluminum alloys. The inter-orifice spacing, A, as illustrated in FIG. 2, is critical for providing maximum dispersion of bubbles while maintaining sufficient distance between the bubbles so as to prevent bubble coalescence. Inter-orifice spacings in the range of 0.25" to 5.00", preferably 0.75" to 2.00" have been found optimum when degassing molten aluminum and its alloys.

The fluxing gas which may be employed in the present apparatus and method comprises a wide variety of well known components including chlorine gas and other halogenated gaseous materials, carbon monoxide as well as certain inert gas mixtures derived from and including nitrogen, argon, helium and the like. A preferred gas mixture for use in the present invention for degassing molten aluminum and aluminum alloys comprises a mixture of nitrogen or argon with dichlorodifluoromethane from about 2 to about 20% by volume, preferably 5 to 15% by volume. In conjunction with this gas mixture, a molten salt mixture 24 may be employed on the surface of the melt residing within chamber 14 which would comprise halides such as sodium chloride, potassium chloride, magnesium chloride or mixtures thereof. It should be noted that the molten salt mixture should be selected to minimize erosion of the refractory lining of the fluxing box. In addition, a gaseous protective cover of argon, nitrogen or the like may be used over the molten metal so as to minimize readsorption of gaseous impurities at the surface of the melt in the same manner as the molten salt. The above-noted and foregoing compositions are presented for purposes of illustration only and do not form a material limitation on the present invention.

Figure 3:
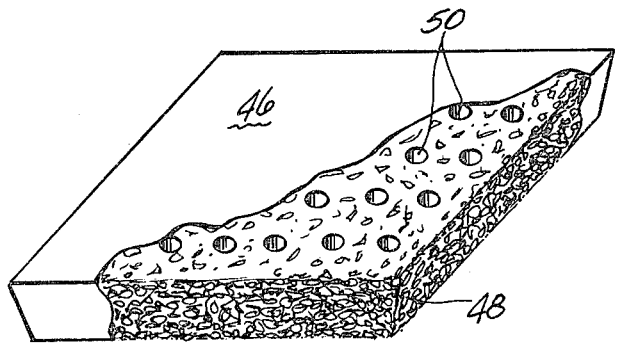
FIG. 3 is a perspective view, partly broken away, of the first filter-type media illustrative of the present invention.

A preferred embodiment of the present invention calls for the provision of filter-type media of uniform, close tolerance at a significant reduction in cost. Accordingly, the filter-type medium comprises a filter plate such as that illustrated in FIG. 3. Filter plate 46 possesses an open cell structure, characterized by a plurality of interconnected voids, such that the molten metal may pass therethrough to remove or minimize entrained solids from the final cast product, or to facilitate the exchange impurities between the melt and a fluxing gas. Such a filter may comprise, for example, a solid filter plate made from sintered ceramic aggregate, or a porous carbon plate. In the preferred embodiment, a ceramic foam filter is utilized as described in U.S. Pat. No. 3,962,081. In accordance with the teaching of said U.S. Patent, ceramic foam filters may be prepared which have an open cell structure characterized by a plurality of interconnected voids surrounded by a web of said ceramic material. The ceramic foam filter described in said U.S. Patent is particularly suitable in the present invention since it is of low cost and may be readily employed on a throwaway basis. Furthermore, this filter is effective in the filtration of molten metal, especially aluminum, at a low cost achieving filtration efficiency with considerable flexibility. In accordance with the preferred embodiment first filter-type medium 30 may be prepared of a relatively coarse pore size ranging from 5 to 20 ppi, which possesses an air permeability ranging from 2500 to $8000 \times 10^{-7}$ cm$^2$, while second filter medium 32 would comprises a relatively fine filter possessing a pore count of from 20 to 45 ppi and an air permeability from 400 to $2500 \times 10^{-7}$ cm$^2$. The metal flow rate through the filter may range from 5 to 50 cubic inches per square inch of filter per minute. Naturally, as noted earlier, both permeability and pore size of the respective filter-type media may be varied to suit the particular material being filtered, and the present invention should not be limited to the aforenoted exemplary ranges.

The ceramic foam filter preferably utilized in the present invention is prepared from an open cell, flexible foam material having a plurality of interconnected voids surrounded by a web of said flexible foam material, such as polyurethane foams or cellulosic foams. The ceramic foam filter may be prepared in accordance with the general procedure outlined in U.S. Pat. No. 3,893,917 wherein an aqueous ceramic slurry is prepared and the foam material impregnated therewith so that the web thereof is coated therewith and the voids substantially filled therewith. The imgregnated material is compressed so that a portion of the slurry is expelled therefrom and the balance uniformly distributed throughout the foam material. The coated foam material is then dried and heated to first burn out the flexible organic foam and then sinter the ceramic coating, thereby providing a fused ceramic foam having a plurality of interconnected voids surrounded by a web of bonded or fused ceramic in the configuration of the flexible foam. Naturally, a wide variety of ceramic materials may be chosen depending upon the particular metal to be filtered. Preferably, a mixture of alumina and chromia is employed, however, these materials may naturally be utilized separately or in combination with other ceramic materials. Other typical ceramic materials which may be employed included zirconia, magnesia, titanium dioxide, silica and mixtures thereof. Normally, the slurry contains from about 10 to 40% of water and one or more rheological agents, binders or air setting agents.

As shown in FIG. 2, the filter plate 46 of the preferred embodiment may have a bevelled peripheral surface 48 adapted to mate with the similarly bevelled rims of the filter chamber illustrated in FIGS. 1 and 4. Naturally, variations in design are contemplated within the scope of the present invention and thus a wide variety of geometric configurations may be contemplated within the scope of the apparatus disclosed herein, and the illustration of FIG. 2 is not meant to be limiting thereto.

In the instance where the filter plate of the present invention is designed to be a throwaway item, it is essential to provide an effective means of sealing the filter plate in place in its holder which is easy to assemble, disassemble and clean up. The holder or filter chamber itself is normally an integral part of a trough, pouring pan or tundish, etc. and should be constructed of refractory materials resistant to the molten metal similar to those used in standard trough construction. It is greatly preferred to seal the filter plate in place using a resilient sealing means or gasket type seal as illustrated and discussed earlier, which peripherally circumscribes the filter plate at the bevelled portion thereof. The gasket type seals insure a leak free installation and also provide an effective parting medium which is essential for ease of disassembly. In addition, since the gaskets or sealing means prevent ingress of metal to the sealing faces of the holder unit, their use considerably eases clean up and effectively prolongs the life of the unit by eliminating problems of metal attack. Furthermore, because of its resiliency, the gasket may provide sufficient frictional force to hold the filter body in place in the holder or filter chamber without resorting to other types of hold-down devices. The resilient sealing means should be non-wetting to the particular molten metal, resist chemcial attack therefrom and be refractory enough to withstand the high operating temperatures.

Plate type filter units of the present invention may be sealed by gaskets around their edges and/or at the periphery of their large faces. The plate type filter units of the present invention are preferably sealed by an edge type seal along the peripheral surface of the filter plate thus providing a positive seal and, in conjunction with the gasket, a mechanical advantage to hold the filter in place. In the event that a simple press fit is insufficient to hold the filter in place, naturally a variety of mechanical devices such as wedges and hold-down weights may be employed. Alternatively, apparatus 10 in FIG. 1 can be made to be split at rims 17 and 18, in a manner not shown, so that pressure can be applied to the seals by the vise-like section cf closing the split unit. The bevelled angle of the filter chamber and corresponding bevelled angle of the filter plate tends to form a positive seal and hold the filter in place against buoyancy forces acting thereupon. Naturally, as indicated above, the gasket or seal should be resistant to the molten metal utilized. Typical seal materials utilized in aluminum processing include fibrous refractory type seals of a variety of compositions, as the following illustrative seals: (1) a seal containing about 45% alumina, 52% silica, 1.3% ferric oxide and 1.7% titania; (2) a seal containing about 55% silica, 40.5% alumina, 4% chromia and 0.5% ferric oxide; and (3) a seal containing about 53% silica, 46% alumina and 1% ferric oxide.

It is a primary feature of the present invention, as illustrated in FIG. 1, to provide the first filter-type medium 30 with an array of holes 50 which are substantially larger than the pore size of the filter itself. In accordance with the teachings of the present invention, large pressure differences were observed between the gas fluxing treatment zone downstream of first filter-type medium and that area upstream of the first filter-type medium when employing the method and apparatus disclosed in aforesaid U.S. Pat. No. 4,052,198. The large pressure differential resulted from a fluxing gas buildup under the filter plate. This head differential placed a physical limit on the amount of fluxing gas which can be passed in countercurrent flow with the molten metal flow, thus limiting the quantity of molten metal which might be effectively and continuously treated. It has been found, in accordance with the present invention, that the pressure differential and thus the head differential can be effectively controlled and decreased by providing an array of holes in the filter plate which are substantially larger than the individual pore size of the filter thereby providing a preferential flow path for the fluxing gas through the filter plate while substantially all of the molten metal passes through the filter body. The decreased head differential obtained in accordance with the present invention allows for an increase in the amount of fluxing gas which can be introduced into the melt thus increasing the quantity of molten metal which can be effectively treated over that of previously known systems. The following example is illustrative of the present invention.

A plurality of ceramic foam filter-type media were prepared in accordance with the general procedure outlined in U.S. Pat. No. 3,893,917 for use as the first filter medium in a pilot scale unit similar to the apparatus illustrated in FIG. 1. Each filter size was 5"×5"×1" thick and was designed to have an air permeability of $1750 \times 10^{-7}$ cm$^2$, a porosity of 0.90 and a pore size of 30 pores per linear inch. An array of 25 holes of equal size were then drilled in each of the filters. It should be noted that besides introducing the holes into the finished filter product by drilling or the like, the holes may be introduced into the flexible foam material prior to the processing as outlined in aforesaid U.S. Pat. No. 3,893,917. It is preferred that the holes are of equal size and uniformly distributed across the surface of the filter plate so that the fluxing gas will be evenly distributed across the filter plate. The hole sizes in the filters varied from 0.10" to 0.45" in increments of 0.05". The filters were then incorporated into the pilot scale unit so as to study the countercurrent gas-liquid flow characteristic of the filtering and degassing process. Liquid was introduced into the filtering and degassing chamber at rates of 924 in.$^3$ per minute, 1386 in.$^3$ per minute and 1848 in.$^3$ per minute. The gas flow was varied so as to produce a ½ inch head drop between the inlet and outlet launder as illustrated by the letter B in FIG. 1. The results are graphically illustrated in FIG. 4.

As can be seen from FIG. 4, the provision of an array of drilled holes in the filter-type media of the present invention allows for a greater volume of fluxing gas to be introduced into the melt thus allowing for a more efficient, high volume filter and degassing apparatus as heretofore known. By providing a preferential flow path of the fluxing gas through the filter plate, the pressure differential across the filter plate is decreased thus resulting in a corresponding decrease in head differential which allows for the use of correspondingly smaller units while increasing degassing efficiency. It has been found that hole sizes of up to 0.45" may be efectively employed without materially diminishing the filtering function of the filter plate.

Figure 5:
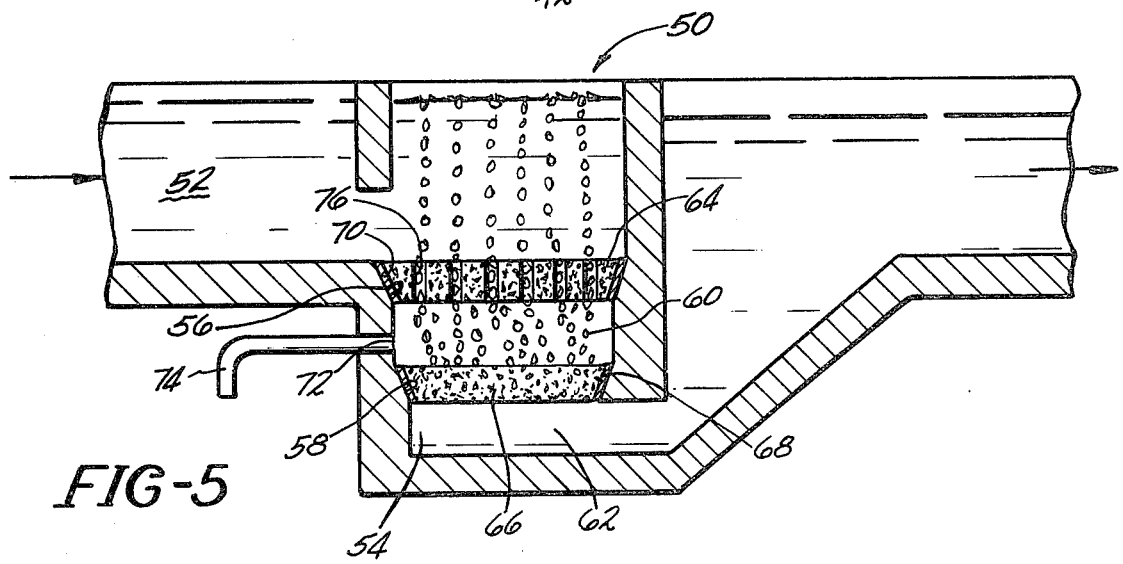
FIG. 5 is a side view of an alternate embodiment of the present invention wherein said filter-type media are disposed in a substantially horizontal relationship.

FIG. 5 illustrates an alternate embodiment of the present invention in which the filter-type plates are substantially horizontally disposed. Apparatus 50 is provided with inlet launder 52 leading to chamber 54 wherein the filtration and degassing operations take place. Chamber 54 is illustrated as roughly bowl-shaped and is disposed with its bottom recessed below the level of inlet launder 52 so that molten metal traveling thereto will flow downwardly through the filter-type media. Chamber 54 is characterized by the provision of at least two peripheral rims 56 and 58, comprising, respectively, a first and a second peripheral rim. First peripheral rim 56 is located at the upper portion of chamber 54 and, in FIG. 1 is positioned at a level continuous with the bottom of inlet launder 52. Second peripheral rim 58, as depicted in FIG. 5, is disposed within chamber 54 so as to effectively divide it into sub-chambers 60 and 62. As with first peripheral rim 56, second peripheral rim 58 is illustrated in the Figure as defining a downwardly converging bevelled surface which enables the expeditious installation and replacement of appropriately configured filter-type media. Though rims 56 and 58 are illustrated as having bevelled surfaces, the invention is not limited thereto, as rims possessing other means for retaining in place the filter-type media of the present invention may be employed as will be noted later on. Rim 58 is shown to be reduced in size from first rim 56 to enable the unobstructed manipulation of the filter medium located therein.

First sub-chamber 60 comprises the area residing between the first and second filter-type media labeled 64 and 66, respectively. As illustrated herein, filter-type media 64 and 66 may likewise possess bevelled peripheral surfaces 68 adapted to mate with correspondingly configured peripheral rims 56 and 58. The bevelled peripheral surfaces 68 when employed are provided with resilient sealing means 70 thereon which are resistant to molten metal, and the respective filter media 64 and 66, including sealing means 70 are sequentially inserted into chamber 54 so that sealing means 70 in each instance engages the respective bevelled surfaces of rims 56 and 58.

As noted earlier, the provision of peripheral rims 56 and 58 supporting respective filter media 64 and 66 effectively divides chamber 54 into sub-chambers 60 and 62. Referring again to FIG. 5, in accordance with the present invention sub-chamber 60 is provided with at least one inlet port 72 comprising the opening or openings of a conduit 74 or manifold through which a fluxing gas may be introduced to the melt from an outside source, not shown.

In accordance with the teachings of the present invention, the first filter-type medium 64 is provided with an array of holes 76 to thereby form a preferential flow path for the fluxing gas. It should be appreciated that the fluxing gas may issue from a sparger plate as shown and described with regard to FIG. 1.

A wide variety of instances exist where the apparatus and method of the present invention in all of the above disclosed variations may be employed. Specifically in the instance of a continuous casting operation, a pair of flux filtration chambers may be employed in parallel arrangement. In such an operation, the great length and associated total flow of metal involved may require the changing of filter media in mid-run. Such changes may be facilitated by the employment of parallel flow channels each containing a filtration chamber, together with a means for diverting flow from one channel to the other, by valves, dams or the like. Flow would thus be restricted to one filtration chamber at a time and would be diverted to an alternate channel once the head drop across the first filtration chamber became excessive. It can be seen that such a switching procedure could supply an endless stream of filtered metal to a continuous casting station.

In addition to the above, the present apparatus and method are capable of several modifications within the scope of the invention to accommodate variations in operating procedure. For example, in the instance where small, individual lots of molten metal are prepared and cast, it is desirable that the filter-type media remain operable for several such lots. To this end, the filter media may be recessed somewhat from the levels of the transfer passageway and exit trough whereby, after melt flow has ceased, residual melt remains which fills the chamber and covers both filters. In conjunction with this modification, at least one cover unit may be employed which would reside above the remaining melt, and would be provided with heating means such as a plurality of radiant heaters to keep the melt in the liquid state.

Other modifications contemplated within the scope of the invention include the provision of a plurality of inlet ports surrounding the respective chambers immediately below the respective first filter-type media. In addition, and likewise not illustrated herein, the inlet ports could be extended to the center of said chambers by the extension of the respective conduits thereinto, whereby fluxing gas may enter the melt from a point centrally located within the chamber. Both the provision of a manifold of fluxing gas inlet ports, and an inlet port or ports centrally located within the chamber, neither of which are illustrated herein, comprise modifications which are, themselves, subject to alterations of design, etc., and accordingly, the invention should not be strictly interpreted thereby.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An improved filter plate means for use in the filtration and degassing of molten metal with a fluxing gas consisting essentially of at least one open cell structure consisting of a plurality of interconnected voids surrounded by a web consisting essentially of ceramic material and further including an array of holes of predetermined sizing and spacing, said holes being substantially larger than the pore size of said filter plate means; said predetermined sizing and spacing providing a preferential path through said filter plate means for said fluxing gas in countercurrent flow to said molten metal while at the same time passing substantially all of said molten metal through said pores of said filter plate.

2. An improved filter plate means according to claim 1 wherein said holes are of equal size.

3. An improved filter plate means according to claim 2 wherein said hole size is from about 0.10" to about 0.45".

4. An improved filter plate means according to claim 4 wherein said filter plate means has an air permeability in the range of 400 to $8000 \times 10^{-7}$ cm$^2$, a porosity of 0.80 to 0.95 and a pore size of 5 to 45 pores per linear inch.

* * * * *

UNITED STATES PATENT AND TRADEMARK OFFICE
CERTIFICATE OF CORRECTION

PATENT NO. : 4,158,632

DATED : June 19, 1979

INVENTOR(S) : Jonathan A. Dantzig & Derek E. Tyler

It is certified that error appears in the above-identified patent and that said Letters Patent are hereby corrected as shown below:

Column 1, line 54, change "The" to read --This--.

Column 2, line 4, change "of" to read --or--.

Column 4, line 30, change "of", first occurrence, to read --for--.

Column 7, line 45, change "comprises" to read --comprise--.

Column 7, line 65, change "imgregnated" to read --impregnated--.

Column 8, line 12, change "included" to read --include--.

Column 8, line 52, change "chemcial" to read --chemical--.

Column 8, line 67, change "section" to read --action--.

Column 10, line 14, change "efectively" to read --effectively--.

Column 12, line 40, claim 4, change "4" to read --3--.

Signed and Sealed this

Twenty-fifth Day of September 1979

[SEAL]

Attest:

*Attesting Officer*

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,158,632
DATED      : June 19, 1979
INVENTOR(S) : Jonathan A. Dantzig & Derek E. Tyler It is certified that error appears in the above-identified patent and that said Letters Patent are hereby corrected as shown below:

In Column 6, line 49, change "0.50" to --0.050--.

In Column 6, line 50, change "0.20" to --0.020--.

Signed and Sealed this

Twenty-third Day of June 1981

[SEAL]

Attest:

RENE D. TEGTMEYER

Attesting Officer     Acting Commissioner of Patents and Trademarks